Nov. 7, 1967     C. GANS ET AL     3,350,977
REMOTE CONTROL FOCUSING ATTACHMENT FOR A MICROSCOPE
Filed July 19, 1963     2 Sheets-Sheet 1

INVENTOR.
Carl Gans &
William Tanski, Jr.

ATTORNEYS

INVENTOR.
Carl Gans &
William Tanski, Jr.

United States Patent Office 3,350,977
Patented Nov. 7, 1967

3,350,977
REMOTE CONTROL FOCUSING ATTACHMENT
FOR A MICROSCOPE
Carl Gans, 17 Pelham Drive, Buffalo, N.Y. 14214, and
William Tanski, Jr., Buffalo, N.Y., said Tanski Jr. assignor to said Gans
Filed July 19, 1963, Ser. No. 296,228
1 Claim. (Cl. 88—1)

This invention relates to a focusing attachment for a microscope. More particularly, it relates to an attachment for a microscope which provides for accurate manual focusing of the same while leaving the hands free to manipulate the object being examined.

In certain scientific investigations, particularly those concerned with biology and botany, it is necessary to dissect a body with the aid of a microscope. As certain parts of the body are removed to disclose parts beneath the same, it becomes necessary to refocus the microscope on successive planes of the body under observation. Since both hands are usually employed in the dissecting process it frequently becomes necessary to release the dissecting instruments in order to refocus the microscope.

Among the objects of this invention is to provide a manually controlled focusing attachment for a microscope which leaves the hands free to continue the dissecting or similar procedure while maintaining the microscope in focus on the part desired.

Among other objects of the invention is to provide a pedal operated focusing attachment for microscopes.

Among still further objects of the invention is to provide remote control operation of the focusing knob of a microscope which has greater control accuracy than is obtainable with direct manual control of the knob.

The objects of the invention are attained by providing a means for rotating the focusing knob of a microscope, a reversible electric motor provided with an accurately controlled clutch or brake connected to the means for rotating the knob, and wiring including a switch device which is adapted to be controlled by the feet, knees, the mouth or other part of the body which is relatively independent of the hands. The motor and means for rotating the focusing knob is secured to the microscope by suitable clamping means, whereas the wiring which includes the switch connecting the motor to a source of power is of such length and proportions that the switch may be positioned at the feet, the knees or near or in the mouth of the user.

Substantially all microscopes include a focusing knob and a supporting means to which the knob-rotating means and clamp, respectively, of the present invention may be attached.

The invention comprises certain additional features of construction which can be readily understood by reference to the description of the drawings, wherein FIG. 1 is a plan view, partly diagrammatic and partly in cross section, of a device made in accordance with the invention.

Figure 1:
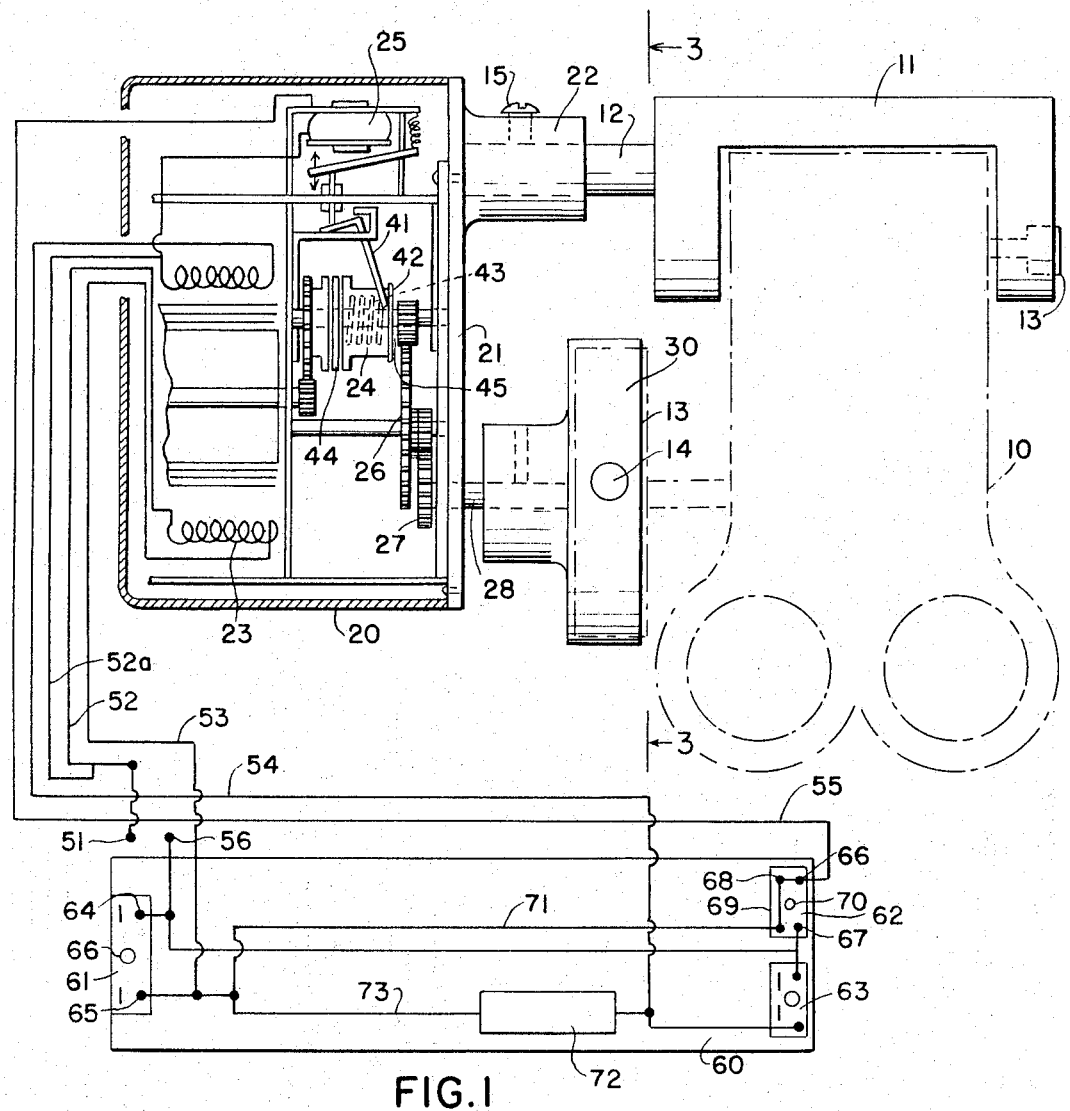

In FIG. 1, the outline of a microscope 10 (not exactly to scale) is shown in the dot-dash lines. The clamp 11 is secured to the frame of the microscope and from the arbor 12 of the clamp 11, the motor-control means 20 and means 30 for rotating the focusing knob is supported. A plate 21 is provided for connecting the motor 20 to the clamp 11. This plate 21 is formed with a sleeve-like arbor support 22, arbor 12 and is otherwise ruggedly constructed so that motor control means 20 can be secured thereto.

The motor control means 20 includes motor 23 shown diagrammatically, clutch-like means 24, clutch-brake operating means 25 and reduction gear train 26. Gear train 26 connects to gear 27 of shaft 28, on which is mounted the clamp 30 for attaching to the focusing knob of microscope 10.

The motor-clutch mechanism is manually controlled clutch-brake operating means is not new, per se, and is shown somewhat diagrammatically. However, the clutch-brake arrangement is an important part of the combination of this invention as it provides for substantially instantaneous stopping and starting. In the position shown in FIG. 1, the lever 41 acts as a friction brake by pressing against disk 42. The clutch is disconnected since spring 43 is not pressed to cause disk 44 to frictionally connect the motor and shaft 45. When solenoid 25 is energized, lever 41 is pivoted to compress spring 43 and thus cause motor 23 to frictionally drive disk 44, shaft 45, gear train 26 and shaft 28. The motor 23 is capacitor synchronous and, depending on the lines which are energized, can be driven either clockwise or counter-clockwise. In the unit shown, the shaft 28 is driven through the reduction gearing and the motor at a speed of about 2 r.p.m. The motor, reduction gearing and brake clutch mechanism can be purchased as a unit and as stated above, is not, per se, new.

The motor-clutch mechanism is manually controlled by way of an outside switch mechanism which may be positioned to be manipulated by the feet, knees, mouth, etc. of the operator. In FIG. 1, the wiring for a pedal switch assembly 60 is shown. One side 51 of a 110 volt A.C. line is connected to wire 52. Thus wire 52 and branch 52a are always hot and when the circuit from wire 52 is completed through wire 53, motor 23 rotates in one direction and when completed through wire 54, motor 23 rotates in the opposite direction. Wire 55 is part of the circuit controlling the solenoid 25 which in turn activates the clutch-brake lever 41. When the circuit from 52a, solenoid 25, and wire 55 is completed to terminal 56, the brake is deactivated and clutch 44 is connected to motor 23.

The pedal assembly 60 comprises three micro-switches 61, 62, 63. Switch 61, for example, has two contacts 64 and 65 which are connected when button 66 is pressed and thus the circuit through wire 53 and wire 52 is completed. Switch 63 is substantially the same as switch 61. Switch 62 is shown as similar to switches 61 and 63 but in switch 62 all four terminals are employed. Terminals 66 and 67 are connected when button 70 is depressed and terminals 68 and 69 are permanently connected so as to complete the circuit through the solenoid 25 when switch 61 connects line 71 to the terminal 56. A condenser 72 having a rating of 0.47 microfarad at 230 volts A.C. is included in the line 73.

Figure 2:
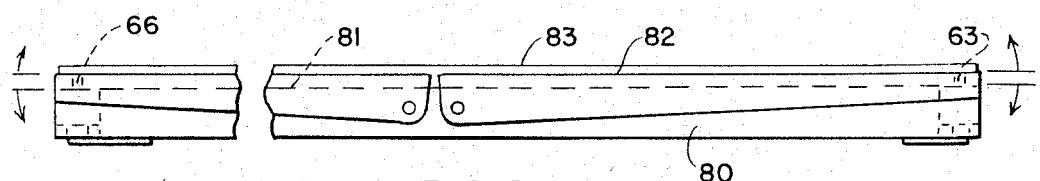
FIG. 2 is a side view of a foot control which is applicable to the device of FIG. 1.
Figure 3:
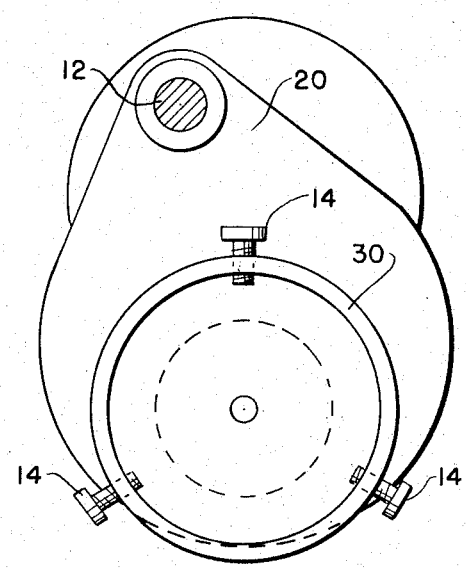
FIG. 3 is a side cross sectional view taken on line 3—3 of FIG. 1.

As shown in FIG. 2, the switch assembly comprises a flat base member 80 of sufficient length to provide space for both shoes of the operator. Pivotally mounted at the center of the base 80 are two levers 81 and 82 which are held upwardly by an elastic cover 83 extending over the top of the base 80. The levers are adapted to pivot by the amount shown at the angles at the sides of the figure. When lever 81 is pivoted it activates button 66 and switch 61. When lever 82 is pivoted by pressing lightly with the foot, the buttons 63 and 70 of micro-switches 63 and 62, respectively, are activated. Thus the switch assembly has three positions, a neutral position and two opposite operating positions. The elastic member 83 holds levers 81 and 82 in the upward position but springs could be employed instead.

Although switch assembly 80 is especially useful as a foot control, it can also be placed under the knees or be reversed and placed on top of the knees for operation by pressing downwardly against a chair or upwardly against a table.

Switch 61 on the one hand and switches 62 and 63 on the other hand can be positioned opposite one another to be operated by the upward or downward movement of a single lever.

In operation the clamp 11 is attached to a suitable arm of a microscope by means of the clamping bolt 13, for example, and clamping ring 30 is fastened onto the focusing control knob 13 of the microscope by means of screws 14. If necessary, arbor 12 is adjusted in support 22 and fixed therein by set-screw 15. Terminals 51 and 56 are connected to 110 v. electric terminals and the device is ready for use. Pressing on lever 81 of foot control causes the focusing knob 13 to turn in one direction at about 2 r.p.m., whereas depressing lever 82 causes movement in the opposite direction. The clutch and braking action is substantially instantaneous so that extremely accurate focusing is obtained without back lash or overtravel. As layers of an object being dissected are removed or folded back exposing lower layers, the microscope can be rapidly focused on the layers without removing the hands or discontinuing the dissecting operation. The device is adjustable to fit any microscope and may be moved from microscope to microscope and also the microscope itself can be moved as desired and is not required to be bolted in a particular position on a table. When the end of the microscope rack is reached, the friction clutch merely slips and the instrument is not damaged.

The features and principles underlying the invention described above in connection with specific exemplifications will suggest to those skilled in the art many other modifications thereof. It is accordingly desired that the appended claim shall not be limited to any specific feature or details thereof.

We claim:

As an attachment for a microscope a remote control device for manipulating the focusing knob of the microscope which can be controlled by parts of the body other than the hands of the operator comprising in combination, means including an inflexible rotatable shaft and clamping ring for attaching to the focusing knob of the microscope, motor means including a reversible motor and an electrically operated clutch-brake mechanism coupled to the reversible motor, said clutch-brake mechanism in turn being directly coupled to said inflexible rotatable shaft and adapted to rotate the latter at a relatively low angular speed, clamping means for holding the motor means and the rotatable shaft and for attaching the same directly to the microscope, a switch assembly comprising three switches connected to said reversible motor and said clutch-brake mechanism, the first of said switches when activated, energizing the said clutch-brake mechanism and causing said motor to rotate in one direction, the second of said switches when activated, causing the motor to rotate in the other direction, and the third switch connected in series with said second switch energizing said clutch-brake mechanism when said second and third switches are activated, and mechanical means for operating said switch assembly comprising two levers pivotably mounted on said switch assembly the first of said levers adapted when pressed to activate said first switch, the second of said levers adapted when pressed to activate said second and third switches.

References Cited

UNITED STATES PATENTS

| | | | |
|---|---|---|---|
| 1,574,286 | 2/1926 | Groenebaum | 192—18.2 |
| 2,180,287 | 11/1939 | Zwack | 192—18.2 |
| 2,967,458 | 1/1961 | Stone | 88—39 |
| 3,071,041 | 1/1962 | Walter | 88—57 |

FOREIGN PATENTS 1,136,033  12/1962  France.

OTHER REFERENCES

Graton, L. C. and Dane, E. B., Jr.: A Precision, All-Purpose Microcamera, in Journal of the Optical Society of America, 27(11): pp. 368–371, November 1937.

DAVID H. RUBIN, *Primary Examiner.*

T. H. KUSMER, *Assistant Examiner.*